US012677236B2

(12) United States Patent
Gomes

(10) Patent No.: US 12,677,236 B2
(45) Date of Patent: Jul. 7, 2026

(54) METHOD, SYSTEM AND PORTABLE DEVICE FOR ENABLING REPORTING OF USER LOCATIONS

(71) Applicant: Latitude Health Technologies Pty Limited, Cammeray (AU)

(72) Inventor: Steve Mike Gomes, Cammeray (AU)

(73) Assignee: Latitude Health Technologies Pty Limited, Cammeray (AU)

( * ) Notice: Subject to any disclaimer, the term of this patent is extended or adjusted under 35 U.S.C. 154(b) by 633 days.

(21) Appl. No.: 17/893,572

(22) Filed: Aug. 23, 2022

(65) Prior Publication Data

US 2024/0073849 A1     Feb. 29, 2024

(51) Int. Cl.
*H04W 64/00*     (2009.01)
*H04W 4/80*     (2018.01)

(52) U.S. Cl.
CPC ............. *H04W 64/00* (2013.01); *H04W 4/80* (2018.02)

(58) Field of Classification Search
None
See application file for complete search history.

(56) References Cited

U.S. PATENT DOCUMENTS

| | | | | | |
|---|---|---|---|---|---|
| 9,807,726 | B1 * | 10/2017 | Nguyen | ................... | H04W 4/02 |
| 2015/0028911 | A1 | 1/2015 | Chang et al. | | |
| 2015/0289111 | A1 * | 10/2015 | Ozkan | ..................... | H04W 4/40 |
| | | | | | 455/456.1 |

| | | | | | |
|---|---|---|---|---|---|
| 2016/0010028 | A1 | 1/2016 | Arhancet et al. | | |
| 2016/0100282 | A1 * | 4/2016 | Pounds | ................... | H04W 4/80 |
| | | | | | 455/456.1 |
| 2017/0016975 | A1 | 1/2017 | Bhadricha et al. | | |
| 2017/0026918 | A1 | 1/2017 | Geng et al. | | |
| 2017/0269189 | A1 | 9/2017 | Swindell et al. | | |
| 2018/0018070 | A1 | 1/2018 | Bhageria et al. | | |
| 2018/0032135 | A1 | 2/2018 | Rijnders | | |

(Continued)

OTHER PUBLICATIONS

Austrailian Patent Office Examination Report for Application No. 2021221490 dated Oct. 4, 2024 (7 pages).

(Continued)

*Primary Examiner* — Adolf Dsouza
(74) *Attorney, Agent, or Firm* — Michael Best & Friedrich LLP

(57)     ABSTRACT

Bluetooth beacons each broadcast a Bluetooth signal on a Bluetooth communication channel. A portable device receives through a wireless data communication channel Bluetooth beacon location data corresponding to locations of the Bluetooth beacons. The portable device monitors the Bluetooth communication channel to detect the Bluetooth signal broadcasted by one of the Bluetooth beacons. Upon detecting the broadcasted Bluetooth signal, the portable device determines whether there is a change in a location of the portable device by comparing the detected Bluetooth signal against the Bluetooth beacon location data stored in a memory of the portable device. In response to determining that there is a change in the location of the portable device, the portable device transmits via the wireless data communication channel to an external computing device portable device location data corresponding to the location of the portable device to report a location of a user of the portable device.

14 Claims, 12 Drawing Sheets

(56)                    References Cited

U.S. PATENT DOCUMENTS

2018/0180706  A1 *    6/2018  Li  ......................... H04W 4/029
2018/0321353  A1     11/2018  Patel et al.

OTHER PUBLICATIONS

Austrailian Patent Office Examination Report for Application No.
2021221490 dated Dec. 9, 2024 (7 pages).
Canadian Patent Office Action for Application No. 3171068 dated
Dec. 9, 2025 (7 pages).

* cited by examiner

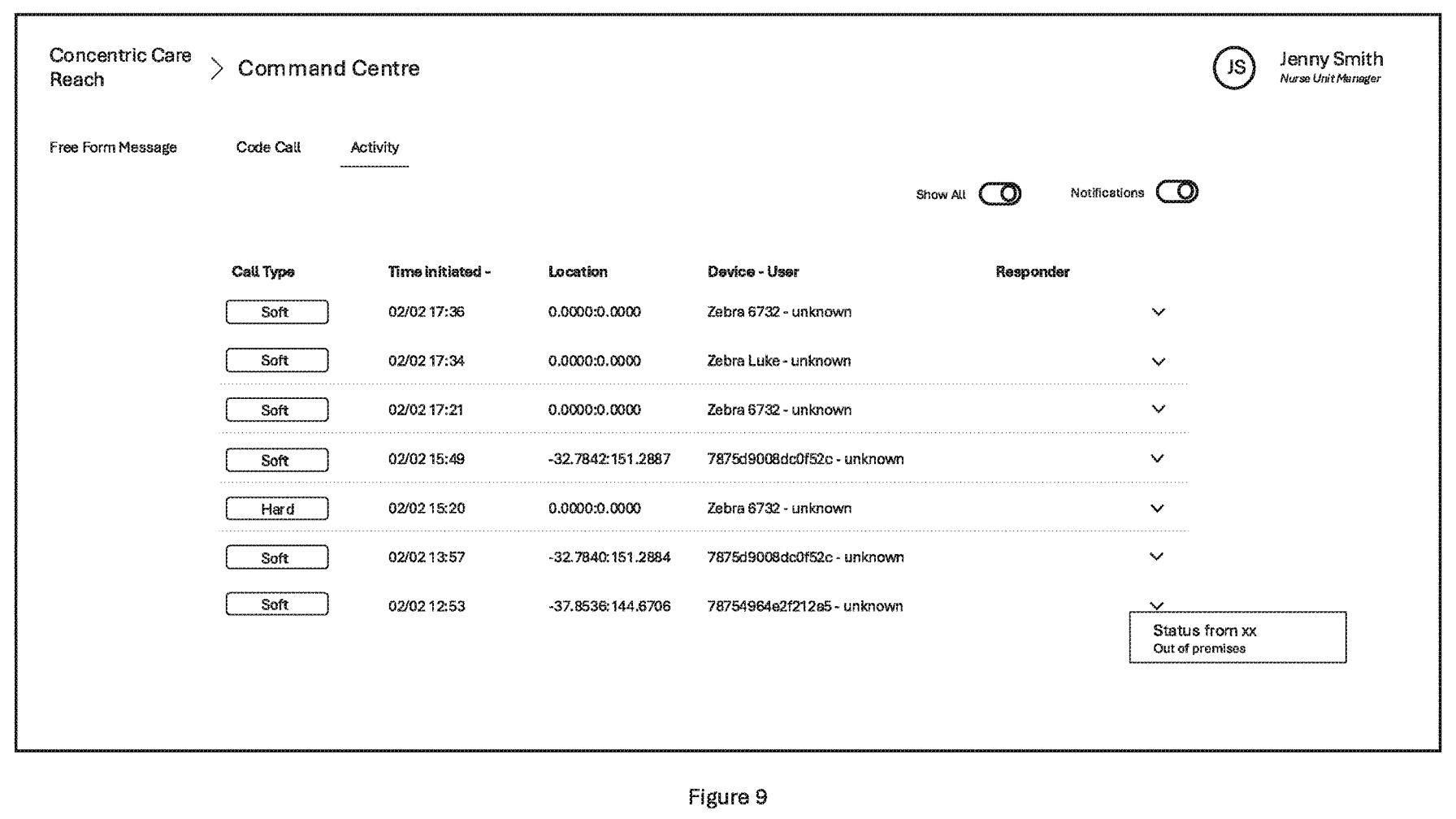

Concentric Care Reach  〉 Command Centre

Free Form Message    Code Call    Activity

Show All ⬭    Notifications ⬭    (JS)  Jenny Smith  *Nurse Unit Manager*

| Call Type | Time initiated – | Location | Device – User | Responder |
|---|---|---|---|---|
| Soft | 02/02 17:36 | 0.0000:0.0000 | Zebra 6732 - unknown | 〉 |
| Soft | 02/02 17:34 | 0.0000:0.0000 | Zebra Luke - unknown | 〉 |
| Soft | 02/02 17:21 | 0.0000:0.0000 | Zebra 6732 - unknown | 〉 |
| Soft | 02/02 15:49 | -32.7842:151.2887 | 7875d9008d0f52c - unknown | 〉 |
| Hard | 02/02 15:20 | 0.0000:0.0000 | Zebra 6732 - unknown | 〉 |
| Soft | 02/02 13:57 | -32.7840:151.2884 | 7875d9008d0f52c - unknown | 〉 |
| Soft | 02/02 12:53 | -37.8536:144.6706 | 78754964e2f212a5 - unknown | 〉 |

Status from xx
Out of premises

Figure 9

METHOD, SYSTEM AND PORTABLE DEVICE FOR ENABLING REPORTING OF USER LOCATIONS

FIELD

The invention relates to a method, system and portable device for enabling reporting of user locations, and is of particular but by no means exclusive application in enabling reporting of locations of health or aged care personnel in indoor environments.

BACKGROUND

In health and aged care environments, there are sometimes situations in which personnel (for example, professionals such as nurses and doctors) are in duress or difficulty. Thus, it is not uncommon for health or aged care personnel to carry some form of device that can be used to alert others when faced with such situations. For example, a health or aged care professional such as a nurse may carry a Bluetooth tag that can be used to alert others in a known alert system. In another system for alerting others used in health or aged care, RFID tags may be carried in place of Bluetooth tags. In yet another example, hand-held devices such as mobile radio devices and smartphones may be used by personnel (for example, by push of a designated button) in order to alert other users (for example, by communicating with access points such as Wi-Fi access points (WAPs)).

When such devices (that is, Bluetooth tags, RFID tags and hand-held devices such as smartphones) are used to alert others, it is advantageous if the system can as accurately as possible pinpoint the location of any health or aged care professional that is in duress or difficulty. In this respect, indoor environments such as hospitals or aged care facilities can be particularly challenging because the facilities typically include a large number of separate rooms across multiple levels of different buildings.

There is a need for an alternative or improved system for enabling reporting of user locations in such health or aged care settings.

SUMMARY OF INVENTION

The invention provides a system for enabling reporting of user locations, comprising:

a plurality of Bluetooth beacons each of which is configured to broadcast a Bluetooth signal on a Bluetooth communication channel at a respective one of a plurality of Bluetooth beacon locations; and a portable device for use by a user, wherein the portable device comprises memory, and is configured to:

receive through a wireless data communication channel Bluetooth beacon location data corresponding to the Bluetooth beacon locations;

store the received Bluetooth beacon location data in the memory;

monitor the Bluetooth communication channel in order to detect for the Bluetooth signal broadcasted by one of the plurality of Bluetooth beacons;

upon detecting the broadcasted Bluetooth signal, determine whether or not there is a change in a location of the portable device by comparing the detected Bluetooth signal against the Bluetooth beacon location data stored in the memory;

in response to determining that there is a change in the location of the portable device, transmit via the wireless data communication channel to an external computing device (such as a server) portable device location data corresponding to the location of the portable device in order to thereby report a location of the user.

In an embodiment, the portable device is configured to monitor the Bluetooth communication channel while communicating data on the data communication channel.

In an embodiment, the portable device is configured to:

upon detecting a plurality of broadcasted Bluetooth signals, determine a strongest one of the plurality of broadcasted Bluetooth signals; and compare the strongest detected Bluetooth signal against the Bluetooth beacon location data stored in the memory of the portable device, in order to determine whether or not there is a change in the location of the portable device.

In an embodiment, the system further comprises a plurality of wireless data access points for enabling the portable device to communicate data via the wireless data communication channel at respective wireless data transceiver locations.

In an embodiment, each Bluetooth beacon is in data communication with at least one of the wireless data access points in order to enable calibration of the Bluetooth beacon location data.

In an embodiment, the system further comprises the external computing device (such as the server).

In an embodiment, the external computing device (such as the server) is configured to receive Bluetooth beacon location data corresponding to the Bluetooth beacon locations, and to store the received Bluetooth beacon location data in a database.

In an embodiment, the portable device receives the Bluetooth beacon location data by receiving from the external computing device (such as the server) the Bluetooth beacon location data stored in the database.

In an embodiment, the portable device is configured to make a request for the Bluetooth beacon location data.

In an embodiment, the portable device makes a request for the Bluetooth beacon location data periodically.

In an embodiment, the external computing device (such as the server) is configured to transmit updated data in respect of the Bluetooth beacon location data, in response to determining that there is an update of the Bluetooth beacon location data stored in the database.

In an embodiment, the updated data is updated version of Bluetooth beacon located data.

The invention also provides a method of enabling reporting of user locations by a system comprising a portable device and a plurality of Bluetooth beacons located at respective locations, comprising:

transmitting through a data communication channel to the portable device Bluetooth beacon location data corresponding to the respective locations of the plurality of Bluetooth beacons;

storing the Bluetooth beacon location data in a memory of the portable device;

controlling each one of the plurality of Bluetooth beacons to broadcast a Bluetooth signal on a Bluetooth communication channel;

controlling the portable device to monitor the Bluetooth communication channel in order to detect for the Bluetooth signal broadcasted by one of the plurality of Bluetooth beacons;

upon detecting the broadcasted Bluetooth signal, determining by the portable device whether or not there is a change in a location of the portable device by comparing the detected Bluetooth signal against the stored Bluetooth beacon location data;

in response to determining that there is a change in the location of the portable device, transmitting from the portable device via the data communication channel to an external computing device (such as a server) portable device location data corresponding to the location of the portable device in order to thereby report a location of the user.

The invention also provides a portable device for reporting user locations, comprising:

a Bluetooth signal detector;

a wireless data communication transceiver;

a memory storing program code; and a processor configured to execute the program code in order to implement at least:

a Bluetooth beacon location data receiver configured to control the wireless data communication transceiver to receive through a wireless data communication channel Bluetooth beacon location data corresponding to respective locations of a plurality of Bluetooth beacons, and to store the Bluetooth beacon location data in the memory;

a Bluetooth beacon detector configured to control the Bluetooth signal detector to monitor a Bluetooth communication channel in order to detect for detect the Bluetooth signal broadcasted by one of the plurality of Bluetooth beacons;

a portable device location determiner configured to, upon detecting the broadcasted Bluetooth signal, determine whether or not there is a change in a location of the portable device by comparing the detected Bluetooth signal against the stored Bluetooth beacon location data;

a portable device location reporter configured to, in response to determining that there is a change in the location of the portable device, control the wireless data communication transceiver to transmit via the data communication channel to an external computing device (such as a server) portable device location data corresponding to the location of the portable device in order to thereby report a location of the user.

The invention also provides a method of reporting user locations by a portable device of a user, comprising:

receiving through a data communication channel Bluetooth beacon location data corresponding to respective locations of a plurality of Bluetooth beacons;

storing the Bluetooth beacon location data in a memory of the portable device;

monitoring a Bluetooth communication channel in order to detect for the Bluetooth signal broadcasted by one of the plurality of Bluetooth beacons;

upon detecting the broadcasted Bluetooth signal, determining whether or not there is a change in a location of the portable device by comparing the detected Bluetooth signal against the stored Bluetooth beacon location data;

in response to determining that there is a change in the location of the portable device, transmitting via the data communication channel to an external computing device (such as a server) portable device location data corresponding to the location of the portable device in order to thereby report a location of the user.

BRIEF DESCRIPTION OF THE DRAWINGS

In order that the invention may be more clearly ascertained, embodiments will now be described, by way of example, with reference to the accompanying drawings, in which:

FIGS. 5 to 9 illustrate an example of an embodiment of the system 10; and

DETAILED DESCRIPTION OF EMBODIMENTS

Figure 1:
FIG. 1 is a schematic diagram of the physical architecture of an embodiment of the system for enabling reporting of user locations.

Referring to FIGS. 1 to 9 of the drawings, there is shown a system 10 for enabling reporting of locations of a user (such as a nurse or some other health or aged care personnel). The system 10 comprises a plurality of Bluetooth beacons 17 (such as an iBeacon™ by developed by Apple Inc.) and at least a portable device (in particular, a hand-held device such as a mobile radio device or a smartphone in the form of an iPhone™ developed by Apple Inc.) that the user can use. Each of the plurality of Bluetooth beacons 17 is configured to broadcast a Bluetooth signal on a Bluetooth communication channel at a respective one of a plurality of Bluetooth beacon locations.

Each portable device 11 is configured to receive Bluetooth beacon location data corresponding to the Bluetooth beacon locations through a data communication channel (such as a Wi-Fi data communication channel). The portable device 11 is also configured to store the received Bluetooth beacon location data in a memory 110 of the portable device 11. Also, the portable device 11 is configured to monitor the Bluetooth communication channel in order to detect for the Bluetooth signal broadcasted by one of the plurality of Bluetooth beacons 17.

As indicated above, the Bluetooth signal can be broadcasted by any of the Bluetooth beacons 17 without any prompting, for example, by the portable device 11 or any other device of the system 10. The portable device 11 is configured to determine whether or not there is a change in a location of the portable device 11 upon detecting the broadcasted Bluetooth signal. The portable device 11 can do so by comparing the detected Bluetooth signal against the Bluetooth beacon location data stored in the memory 110.

In response to determining that there is a change in the location of the portable device 11, the portable device 11 can transmit, via the data communication channel to a server 19, portable device location data corresponding to the location of the portable device 11, in order to thereby report a location of the user. Thus, the system 10 is suitable for use in a health or aged care setting in which health or aged care personnel may need to report their location when in duress or during emergencies.

Because each portable device 11 detects for a Bluetooth signal and not a longer-range communication signal such as a Wi-Fi signal, the system 10 can provide a more accurate location of the user than a system that relies on detecting some longer-range communication signal such as a Wi-Fi signal.

In addition, having each portable device 11 merely detecting a Bluetooth signal can be advantageous, in that the Bluetooth signal can be broadcasted by a Bluetooth beacon 17 instead of some form of Bluetooth transceiver that is capable of both transmitting and receiving Bluetooth communications. Even if a Bluetooth transceiver is used as a Bluetooth beacon 17 to broadcast the Bluetooth signal, the portable device 11 need not necessarily establish a connection (for example, pair) with the Bluetooth beacon 17.

Also, it is envisaged that the accuracy of user location provided by the system 10 can be easily improved by having more Bluetooth beacons 17 located at different locations. In this respect, it will be appreciated that each Bluetooth beacon 17 can essentially operate independently of other devices of the system 10 and that the scale and accuracy of the system 10 can be improved by introducing new Bluetooth beacons without requiring complex configuration required to coordinate the new Bluetooth beacons.

By using portable devices 11 that can both monitor a Bluetooth communication channel and communicate via a data communication channel, the system 10 can simultaneously detect for a Bluetooth signal and communicate data (for example, transmit a user location, receive up-to-date Bluetooth beacon location data, or both) and hence is advantageous when compared to a system that relies only one form of communication protocol such as only Bluetooth or only Wi-Fi. In addition, it is envisaged that an embodiment of the system 10 may be particularly advantageous in indoor environments as the system 10 can provide coverage across multiple floors or levels with high accuracy. It is also envisaged that an embodiment of the system 10 may be particularly advantageous the accuracy can be variable across different coverage areas depending on application needs and other constraints (such as budgets). Also, it is envisaged that an embodiment of the system 10 may be particularly advantageous as the system 10 can define coverage areas of different shapes and sizes. It is also envisaged that the system 10 may be advantageous in that roll-out (or expansion) of the system 10 may be progressive. In particular, unlike certain prior art solutions, a full survey of the indoor environment need not be carried before deployment of the system 10.

It is envisaged that each portable device 11 is typically a hand-held device that is specifically designed to be carried by users. In particular, it is envisaged that each portable device 11 is designed for a user to carry, for example, in a clothes pocket. While a portable device 11 may be based on a smartphone, it is envisaged that the portable device 11 is likely to include additional elements such as a specific duress mechanism that a user of the portable device 11 can activate (such as a button that a user can press, or by way of a combination of the state of each of one or more sensors) in order to enable or trigger reporting of the location of the portable device 11, additional protective casing that meets specific regulations (in particular, health or safety regulations in health and aged care settings), rules or laws, and other mechanisms for use in settings such as health or aged care facilities.

It is envisaged that the server 19 may be implemented by any suitable computing device. For example, the server 19 may be a computer server located remotely from other devices of the system 10, and may be implemented via "cloud computing". Such a computer server need not be a dedicated computer server, and may be a desktop personal computer or a portable computer. A person skilled in the art will appreciate that a portable computer may be a laptop computer, a notebook computer, a tablet computer, or a mobile computing device such as a smartphone. Persons skilled in the art will appreciate that the server 19 may be implemented by only a part of a computing device such as a programmable circuit. Persons skilled in the art will appreciate that the server 19 may be implemented by multiple computing devices such that each computing device implements only a part or parts of the server 19.

FIG. 1 is a schematic diagram of the physical architecture of an embodiment of the system 10. The system 10 comprises a server 19 connected to a database 18 and a network 16. Depending on the implementation, the network 16 may comprise merely a wireless local area network (WLAN) or include other networks, for example, the Internet.

The system 10 also comprises a plurality of wireless data access points 15 and a plurality of Bluetooth beacons 17. It is envisaged that a Bluetooth beacon 17 may be deployed in various ways. For example, a Bluetooth beacon 17 may be integrated in a television or TV, or as a bedside terminal such as one that can be used for tracking equipment, and so leverage off already existing device or hardware in a coverage area such a room of a health or aged care facility, particularly, for use as a resource for power. It is envisaged that a wireless data access point 15 and a Bluetooth beacon 17 may be the same device. For example, a wireless data access point 15 may be a Wi-Fi access point that may also simultaneously operate as a Bluetooth beacon 17. In this embodiment, each wireless data access point 15 is a Wi-Fi access point. However, it is envisaged that a wireless data access point 15 may be some other form of access point that can allow a portable device or devices 11 to communicate data on a wireless data communication channel. Examples of such alternative wireless data communication channels include cellular data communication channels like 4G communication channels.

The system also comprises one or a plurality of portable devices 11 for use by respective users. In this embodiment, each portable device 11 is based on a smartphone that is configured to communicate via both Bluetooth and Wi-Fi. As indicated above, a portable device 11 may not be necessarily based on a smartphone. Accordingly, there may be different types of portable devices 11 in an alternative embodiment of the system 10. Thus, it will be appreciated that the system 10 may include the same or different types of portable devices.

Depending on the embodiment, the system 10 may comprise more than one or only one portable device 11. Also, the system 10 may comprise one or more wireless access points 15 or one or more Bluetooth beacons 17. Also, it is envisaged that each Bluetooth beacon 17 may be configured to operate over one or more different forms of Bluetooth standards including BLE or Bluetooth Smart. Persons skilled in the art will appreciate that the database 16 may be implemented as a standalone device (which may be implemented remotely from the server 19, that is, "over the cloud") or as part of the server 19.

As indicated above, the Bluetooth beacon 17 is adapted to broadcast a signal using some form of Bluetooth such as BLE or Bluetooth Smart. The signal is a designated signal that can used by each portable device 11 to identify a particular Bluetooth beacon 17 from the plurality of Bluetooth beacons 17. For example, the designated Bluetooth signal may include a Bluetooth beacon identifier among a plurality of Bluetooth beacon identifiers stored at each portable device 11, and so each portable device 11 can identify whether a Bluetooth signal detected by the portable device 11 corresponds to any particular one of the plurality of Bluetooth beacons 17 by way of the identifier included in the detected Bluetooth signal. In this respect, it is envisaged that the Bluetooth signal being broadcasted by each Bluetooth beacon 17 may be of a standardized format such that off-the-shelf Bluetooth beacon products may be used.

As illustrated in FIG. 1, each wireless data access point 15 is configured such that any one of the portable devices 11 with range of the wireless data access point 15 may communicate data via the wireless data access point 15 on a wireless communication channel. Thus, the wireless data access points 15 of the system 10 are reasonably spread out to ensure that there is sufficient coverage of any portable device 11 within the area in which the system 10 is intended to cover. For example, it is envisaged that in a health care setting such as in a hospital, there will be a wireless data access point 15 in at least each ward of the hospital and a Bluetooth beacon 17 in at least each room of each ward of the hospital. It is envisaged that a portable device 11 may not always be in coverage of a wireless data access point 15 in embodiments of the system 10, and so any wireless data communication between a portable device 11 that is not in coverage may be delayed only until the portable device 11 comes into coverage of a wireless data access point 15. Also, while FIG. 2 illustrates only Bluetooth beacons 17 with Bluetooth communication coverage that is within wireless data communication coverage of a wireless data access point 15, it is envisaged that this need not be the case in all embodiments of the system 10.

It is envisaged that the system 10 may not include all the components illustrated in FIG. 1. For example, each wireless data access point 15 may be connected to the server 19 (which itself may be a wireless data access point 15) directly without going through a network 16. Likewise, the system 10 may include additional components not illustrated in FIG. 1. For example, it is envisaged that the system 10 may include a "command centre" computing device for enabling a user of the system 10 to manage the devices (for example, in response to any re-calibration of locations of the plurality of Bluetooth beacons 17) and the data (for example, in response to updating of the Bluetooth beacon location data) used in the system 10.

The system 10 comprises a number of functional components for enabling reporting of user locations. It is envisaged that the functional components are typically implemented by a processor of a computing device executing program code and data stored in a memory of the computing device. In this respect, a person skilled in the art will appreciate that one or more of the components could be implemented in an alternative manner, for example, as a dedicated circuit.

Figure 2:
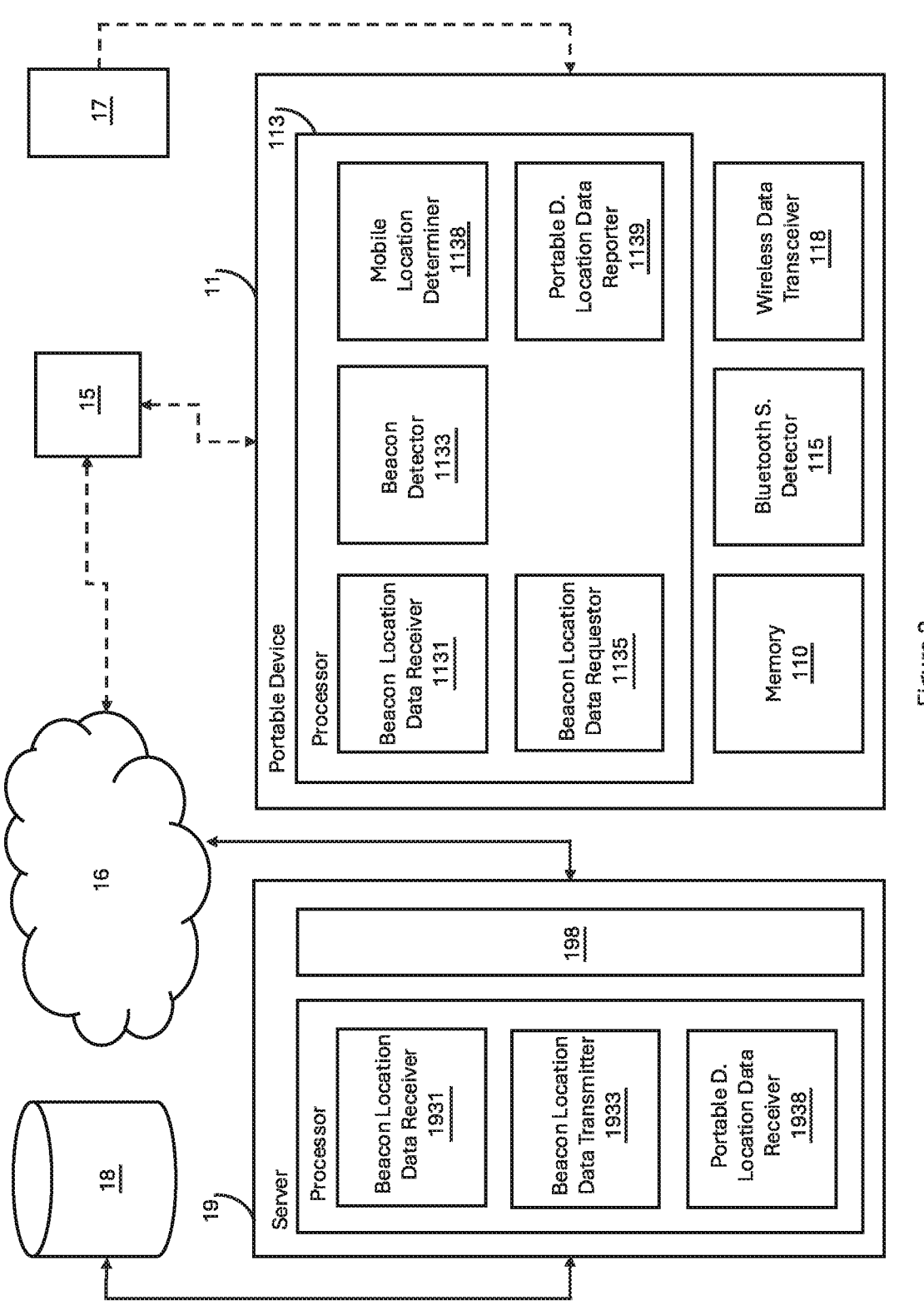
FIG. 2 is a schematic diagram of the functional components of the system of FIG. 1.

FIG. 2 is a schematic diagram showing the functional components of the system 10. In FIG. 2, only one of the Bluetooth beacons 17 and only one of the wireless data access points 15 are shown. It is envisaged that a mobile device 11 may have additional or alternative functional components to other ones or ones of the mobile devices 11 of the system 10. Also, it is envisaged that the system 10 may comprise multiple servers 19 or multiple databases 18 each of which may be in communication with different mobile devices 11 and different wireless access points 15.

Tuning now to the server 19 of the system 10, the server 19 is connected to a database 18, and comprises a processor 193 and a communication interface 198. The processor 193 of the server 18 is arranged to use program code and data in order to implement functional components in the form of a beacon location data receiver 1931, a beacon location data transmitter 1933, and a mobile location data receiver 1938. It is envisaged that the program code and data can typically be stored in a memory (not shown) of the server 19, or remotely (for example, via cloud storage solutions) in a distributed manner.

The mobile location data receiver 1938 is configured to receive from each portable device 11 mobile location data corresponding to a location of the portable device 11. In this embodiment, the mobile location data is received via a wireless data communication channel through the network 16 and one of the wireless data access points 15. However, a person skilled in the art will appreciate that the mobile location data may be received from a portable device 11 in a different manner. For example, the mobile location data may be received directly from a portable device 11 via a wireless data communication channel in some other embodiment of the system 10.

The beacon location data receiver 1931 is configured to receive Bluetooth beacon location data corresponding to the respective locations of the plurality of Bluetooth beacons 17, and to store the received Bluetooth beacon location data. In this embodiment, it is envisaged that the Bluetooth beacon location data is received from an "command centre" computing device (not shown) that is operated by a user who determines (or "calibrates") the locations of the plurality of Bluetooth beacons 17. However, the Bluetooth beacon location data may be received from other devices. For example, it is envisaged that each wireless data access point 15 may be configured to transmit the location corresponding to each Bluetooth beacon 17 that may be in Bluetooth communication with the wireless access point 15, and the beacon location data receiver 1931 may be configured to periodically receive the Bluetooth beacon location data corresponding to the respective locations of the plurality of Bluetooth beacons 17 from the plurality of wireless data access points 15. In this respect, it is envisaged that devices such as the wireless data access points 15 may be fixed or moving depending on changing needs. In this embodiment, the Bluetooth beacon location data received by the server 19 is stored in the database 18. However, it is envisaged that the received Bluetooth beacon location data may be stored elsewhere, for example, by a memory of the server 19 or remotely in the "cloud" in alternative embodiments.

The beacon location data transmitter 1933 is configured to transmit the Bluetooth beacon location data stored in the database 18 to each of the portable devices 11 such that a local copy of the Bluetooth beacon location data is available for access by each of the portable devices 11. In this embodiment, the beacon location data transmitter 1933 is configured to transmit the Bluetooth beacon location data to all portable devices 11 upon receiving an updated version of the Bluetooth beacon location data. Also, the beacon location data transmitter 1933 is configured to transmit the Bluetooth beacon location data to a portable device 11 upon receiving a request from the particular portable device 11, for example, when the particular portable device 11 is turned on and within range of a wireless data access point 15 such that the particular portable device 11 can automatically transmit a request for the Bluetooth beacon location data via the wireless data access point 15 and the network 16 to the server 19 once the particular portable device 11 is turned on. However, it is envisaged that the beacon location data transmitter 1933 may not be so configured in an alternative embodiment. For example, in an alternative embodiment of the system 10, the beacon location data transmitter 1933 may be configured to not transmit the Bluetooth beacon location data to a portable device 11 if there is no updated version of the Bluetooth beacon location data in order to minimize unnecessary transmissions.

In an alternative embodiment of the system 10, not all of the components of the server 19 illustrated in FIG. 2 may be implemented. In particular, it is envisaged that functional components such as the beacon location data transmitter 1933 and the beacon location data receiver 1931 may not be implemented by the server 19 in an alternative embodiment of the system 10. For example, in an alternative embodiment, the Bluetooth beacon location data may be stored in a portable device 11 without requiring the portable device 11 to make a request for or receive the Bluetooth beacon location data from the server 19 or another device. Likewise, the server 19 may include additional components not illustrated in FIG. 2. For example, a server 19 may include display and/or input devices.

Turning now to the portable devices 11 of the system 10, each portable device 11 comprises a Bluetooth signal detector 115 for detecting at least one Bluetooth signal from another Bluetooth device such as a Bluetooth signal broadcasted by a Bluetooth beacon 17, and a wireless data transceiver 118 for communicating data with one or more other wireless data communication devices such as one or more of the wireless data access points 15. Each portable device 11 also comprises a processor 113 and memory 110. Program code and data is stored in the memory 110. The processor 113 is configured to implement a number of functional components based on the stored program code and stored data.

Firstly, the processor 113 can implement a Bluetooth beacon location data receiver 1131 configured to control the wireless data communication transceiver 118 to receive the Bluetooth beacon location data corresponding to respective locations of the plurality of Bluetooth beacons 17, and to store the Bluetooth beacon location data in the memory 110. In this embodiment, the portable device 11 receives through the wireless data communication channel from the server 19 the Bluetooth beacon location data stored in the database 18. However, it is envisaged that the Bluetooth beacon location data receiver 1131 may be configured to either additionally or alternatively receive the Bluetooth beacon location data from another device, for example, directly from the database 18 via the network 16, or even from another portable device 11 which may be fixed or moving (for example, by way of a mesh network).

The processor 113 is also configured to implement a Bluetooth beacon detector 1113 that can control the Bluetooth signal detector 115 to monitor the Bluetooth communication channel such that the portable device 11 can detect for one or more Bluetooth signals such as a Bluetooth signal broadcasted by one of the plurality of Bluetooth beacons 17. In this embodiment, each portable device 11 based on a smartphone that can simultaneously monitor the Bluetooth communication channel while communicating data on the data communication channel. That is, the Bluetooth signal detector 115 can be used to detect for one or more Bluetooth signals while the wireless data transceiver 118 is used to communicate data with one or more other wireless data communication devices such as a wireless data access point 15, or one or more other portable devices 11. However, it is envisaged that there may be a portable device 11 of the system 10 that may at any one time only either monitor the Bluetooth communication channel or communicate data on the data communication channel.

Also, the processor 113 is also configured to implement a portable device location determiner 1138 that is configured to, upon the Bluetooth beacon detector 1113 detecting a broadcasted Bluetooth signal, determine (or compute) whether or not there is a change in a location of the portable device 11. The portable device location determiner 1138 is configured to determine whether there is a change in the location, by comparing the Bluetooth signal detected by the Bluetooth beacon detector 1113 against the Bluetooth beacon location data stored locally in the memory 110 of the portable device 11. As indicated above, more than one Bluetooth signal may be simultaneously detected by the Bluetooth signal detector 115. If this is the case, the portable device location determiner 1138 can determine which one of the plurality of broadcasted Bluetooth signals is to be compared against the Bluetooth beacon location data stored in the memory 110 of the portable device 11. For example, the portable device location determiner 1138 can be configured to determine the strongest Bluetooth signal from the plurality of broadcasted Bluetooth signals, before comparing the strongest detected Bluetooth signal against the locally stored Bluetooth beacon location data in one embodiment. In another embodiment, the portable device location determiner 1138 can be configured to determine most recently detected Bluetooth signal from the plurality of broadcasted Bluetooth signals detected by the Bluetooth signal detector 115, before comparing the most recently detected Bluetooth signal against the locally stored Bluetooth beacon location, in order to determine whether or not there is a change in the location of the portable device 11. In this embodiment, each portable device 11 continuously compute the location of the portable device 11 (and then determine whether or not there is a change in the location) based on any detected Bluetooth signal. However, it is envisaged that alternative embodiments of the system 10 may involve portable devices 11, for example, low-power versions of such devices 11, that do not do so. In this respect, an embodiment of a portable device 11 may be configured to continuously compute only upon detecting movement of the portable device 11, for example, by way of a movement sensor or detector such as an accelerometer or a GPS chip. Also, another embodiment of a portable device 11 may be configured to additionally or alternatively compute the location of the portable device 11 (and then determine whether or not there is a change in the location) based on patterns and/or prior knowledge (for example, by way of machine learning and/or path of movement).

The processor 13 also implements a portable device location reporter 1139 configured to report a location of the user, in response to the portable device location determiner 1138 determining that there is a change in the location of the portable device 11. Specifically, the portable device location reporter 1139 can control the wireless data communication transceiver 118 to transmit to the server 19 portable device location data corresponding to the location of the portable device 11. In this embodiment, the portable device location data is transmitted via the data communication channel through a wireless access point 15 and the network 16. However, it is envisaged that the portable device location data may be reported in some other way. For example, the portable device location data may be transmitted from the portable device 11 to the server 19 directly in an alternative embodiment. Depending on the embodiment, the portable device location reporter 1139 may be configured to report a user location only upon some form of activation by the user or regularly. For example, it is envisaged that the portable device 11 is configured to automatically report a user location upon the user pressing a duress button on the portable device 11 after there is a change in the location of the portable device 11. Additionally or alternatively, in an embodiment of the system 10, a portable device 11 may be configured to periodically report the location of a user, for example, after designated intervals of time after there is a change in the location of the portable device 11, or based on certain conditions such as proximity to exit areas, areas without coverage etc.

In this embodiment, the processor 113 is also configured to implement a beacon location data requestor 1135 configured to make a request for the Bluetooth beacon location data. In this embodiment, the portable device 11 is configured to make such a request to the server 19 for the Bluetooth beacon location data periodically in order to obtain any updated copy of the Bluetooth beacon location data. As indicated above, if there is an updated copy of the Bluetooth beacon location data available for transmission by the server 19, the server 19 can transmit the updated beacon location data to the portable device 11 in response to the request by the beacon location data transmitter 1933 for the Bluetooth beacon location data.

Like with the server 19, it is envisaged that not all of the components of the portable device 11 illustrated in FIG. 2 may be implemented in an alternative embodiment of the system 10. For example, a portable device 11 may not include a beacon location data requestor 1135 in an embodiment of the system 10, and so the mobile device 11 may rely on the periodic updates of the Bluetooth beacon location data from the server 19 in such an embodiment. In another embodiment, the Bluetooth beacon location data can be manually stored in memory at the time of shipping of the software application for a portable device 11. As suggested above, it is envisaged that a portable device 11 will typically include components that make the portable device 11 suitable for use in health or aged care settings. In particular, it is envisaged that a portable device 11 will typically include a specifically designed mechanism for a user of the portable device 11 to activate, such as a duress button that can be pressed by a user. Such a mechanism may be implemented by way of additional hardware such as a button that is part of a casing for the portable device 11, or software such as a virtual button that is constantly displayed on a touchscreen of the portable device 11 such that a user may press on the virtual button when the user is in duress or a man-down situation.

Figure 3:
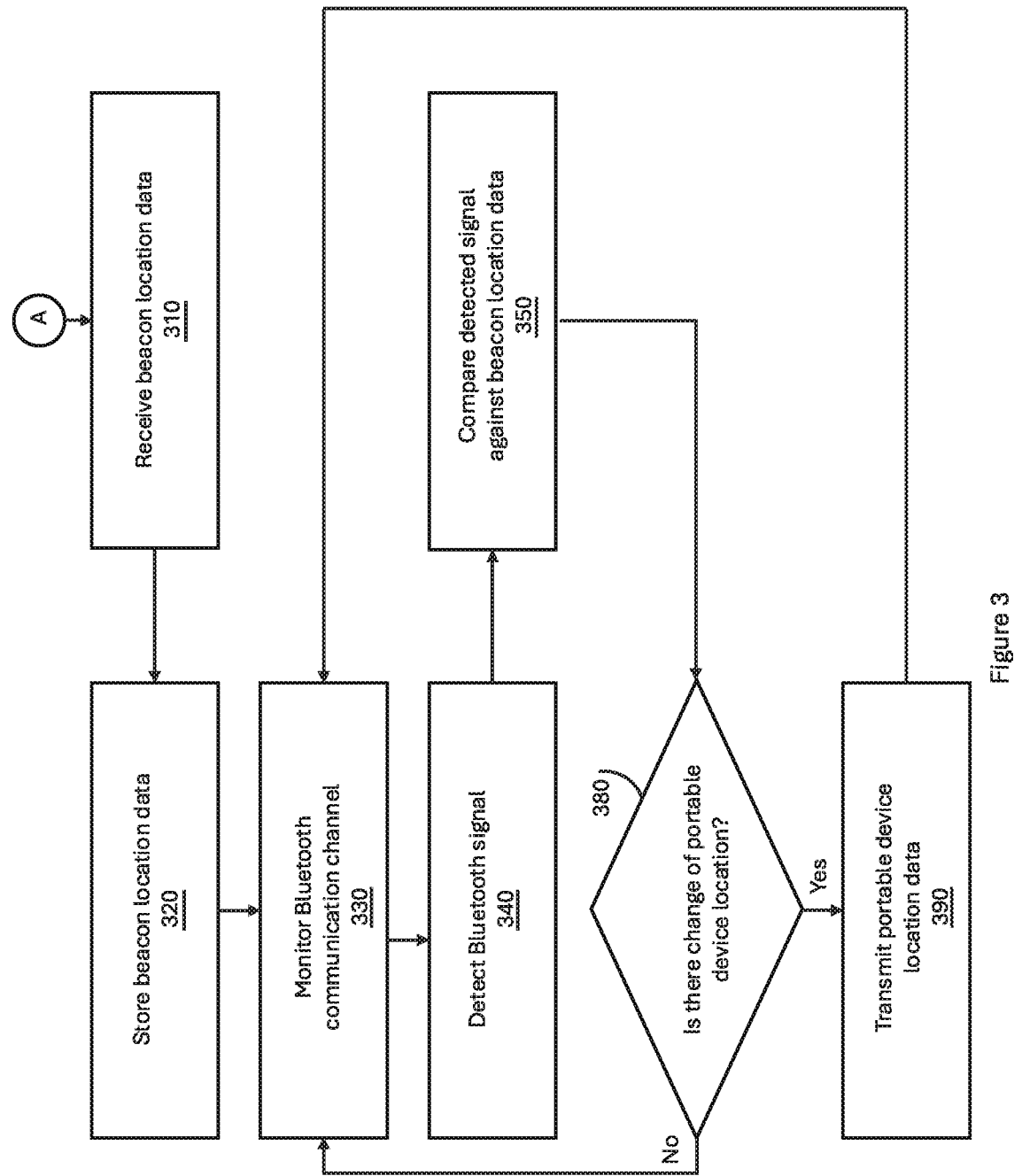
FIG. 3 is a flow chart of an embodiment of the method of enabling reporting of user locations, carried out using the system of FIGS. 1 and 2.

FIG. 3 is a flow chart of an embodiment of the method of enabling reporting of user locations carried out using the system of FIGS. 1 and 2. As indicated by "A" in the figure, additional steps may precede the steps illustrated in the figure. These additional steps are described in more detail below with reference to FIG. 4.

At step 310, the beacon location data receiver 1131 implemented by the processor 113 of a portable device 11 of the system 10 receives Bluetooth beacon location data corresponding to the respective locations of the plurality of Bluetooth beacons 17 of the system 10 using the wireless data transceiver 118 of the portable device 11. As indicated above, it is envisaged that every portable device 11 of the system 10 will receive the Bluetooth beacon location data before detecting for a Bluetooth signal broadcasted by one of the plurality of Bluetooth beacons of the system 10. In addition, updated or modified versions of the Bluetooth beacon location data may be received by a portable device 11 after the portable device 11 has previously already received a version of the Bluetooth beacon location data.

After receiving the Bluetooth beacon location data, the beacon location data receiver 1131 then stores the received Bluetooth beacon location data in the memory 110 of the portable device 11 at step 320. As indicated above, it is envisaged that each portable device 11 stores a local copy of the Bluetooth beacon location data such that the portable device 11 can subsequently compute the location of the portable device 11 and so determine whether or not there is a change of the location of the portable device 11. Depending on the implementation, the memory 110 of the portable device 11 may include only a single (or most recent) copy of the Bluetooth beacon location data or store multiple versions of the Bluetooth beacon location data, for example, if there is a need to refer to a previous version of the Bluetooth beacon location data when the latest version of the Bluetooth beacon location data is incomplete.

At 330, the beacon detector 1133 implemented by the processor 113 of the portable device 11 controls the Bluetooth signal detector 115 of the portable device 11 to monitor the Bluetooth communication channel in order to detect for any Bluetooth signal that is broadcasted by a Bluetooth beacon 17. As will be described in more detail in relation to FIG. 4 below, each Bluetooth beacon 17 can broadcast a Bluetooth signal that can be recognized or identified by each portable device 11 such that the portable device 11 can subsequently compute a location of the portable device or determine whether or not there is a change in the location of the portable device based on the Bluetooth signal. As indicated above, a portable device 11 may continuously monitor the Bluetooth communication channel or only do so when a separate mechanism of the portable device 11 prompts the portable device to do so. For example, a portable device 11 may monitor the Bluetooth communication channel only when an accelerometer of the portable device 11 senses movement of the portable device 11.

At step 340, the beacon detector 1133 detects one or more Bluetooth signals. As indicated above, each Bluetooth beacon 17 is configured to broadcast a Bluetooth signal that can be detected by a portable device 11 when the portable device 11 is within range of the Bluetooth beacon 17. It is envisaged that the beacon detector 1133 can upon detecting a Bluetooth signal, determine whether or not the Bluetooth signal is from a Bluetooth beacon 17 of the system 10 or not, and to ignore or disregard any Bluetooth signal that is not broadcasted by a Bluetooth beacon 17 of the system 10. It is envisaged that the portable device 11 can do so in different ways. For example, the beacon detector 1133 can do by checking an identifier of the broadcast.

Upon detecting the at least one Bluetooth signal, the mobile location determiner 1138 implemented by the processor 113 of the portable device 11 determines whether or not there is a change in the location of the portable device 11. If multiple Bluetooth signals are detected by the portable device 11, the mobile location determiner 1138 determines from the Bluetooth signals the Bluetooth signal which is strongest (that is, the Bluetooth signal that is received at the highest power). Then, the mobile location determiner 1138 compares the detected Bluetooth signal (or the strongest one of the detected Bluetooth signals) against the Bluetooth beacon location data stored in the memory 110 at step 350 in order to subsequently determine whether or not there is a change in the location of the portable device 11.

At step 380, the mobile location determiner 1138 makes the determination of whether or not there is a change in the location of the portable device 11 based on the comparison. If the mobile location determiner 1138 determines that there is no change in the portable device's location, the portable device 11 continues to monitor the Bluetooth communication channel at step 330. Otherwise, the mobile location data reporter 1139 implemented by the processor 113 of the portable device 11 controls the wireless data communication transceiver 118 to transmit via the data communication channel to the server 19 portable device location data corresponding to the location of the portable device 11 in order to thereby report a location of the user at step 390. Depending on the implementation, the portable device location data corresponding to the location of the portable device 11 may also be stored locally at the portable device 11 for subsequent use by the portable device 390, for example, for comparison with new portable device location data.

After the portable device location data is transmitted by the portable device 11 at step 390, the mobile location data receiver 1938 implemented by the processor 193 of the server can receive the portable device location data transmitted from the portable device 11 using the communication interface 198 of the server 19, and then store the received portable device location data in the database 18 in connection with the server 19. As indicated above, actions by other users of the system 10 may then be undertaken depending on whether or not there is (and if so, the nature of) a duress situation.

As indicated in the FIG. 3, additional steps may optionally precede the steps illustrated in the FIG. 3. These optional preceding steps are described in more detail below with reference to FIG. 4.

At step 410, the beacon location data receiver 1931 implemented by the processor 193 of the server 19 of the system 10 receives Bluetooth beacon location data corresponding to the respective locations of the plurality of Bluetooth beacons 17 using the communication interface 198. Depending on the implementation, the Bluetooth location data may be received in different ways. For example, in an embodiment of the system 10, the server 19 may receive the Bluetooth beacon location from a standalone "command centre" computing device located remotely from the server 19. In another embodiment of the system 10, the server 19 may receive Bluetooth beacon location data from each of the wireless data access points 15 each of which is configured to detect any Bluetooth beacon 17 that is within range of the wireless data access point 15. Thus, it is envisaged that the respective locations of all of the plurality of Bluetooth beacons 17 may be received from multiple different devices rather than from a single device. In this respect, it is envisaged that the server 19 may be configured such that the server 19 may simultaneously receive Bluetooth beacon location data from multiple devices.

Upon receiving any Bluetooth beacon location data, the beacon location data receiver 1931 stores the received Bluetooth beacon location data at step 430. In this embodiment, the received Bluetooth beacon location data is stored in the database 18. However, it is envisaged that the received Bluetooth beacon location data may be stored elsewhere, for example, in a memory of the server 19 itself.

It is envisaged that steps 410 and 430 may occur more than once, before the Bluetooth beacon location data stored in the database 18 is communicated to a portable device or devices 11.

In this embodiment, the server 19 is configured to transmit the stored Bluetooth beacon location data either in response to a request from a portable device 11 or automatically, for example, when there is an update of the Bluetooth beacon location data stored in the database 18, or after a designated period of time (that is, periodically).

At step 460, the server 19 receives a request for the Bluetooth beacon location data from a portable device 11. The request may be received by the server 19 using the communication interface 198 over the network 16 from a wireless data access point 15 in wireless data communication with the portable device 11.

In response to receiving the request from the portable device 11, the beacon location data transmitter 1933 implemented by the processor 193 of the server 19 transmits the Bluetooth beacon location data stored in the database 18 over the network 16 to the wireless data access point 15 in wireless data communication with the portable device 11 at step 480.

As indicated above, the beacon location data transmitter 1933 may also, either periodically or when there is an update of the Bluetooth beacon location data stored in the database 18, transmit the stored Bluetooth beacon location data to one, more or every portable device 11 of the system 10 without being prompted at step 490.

Figure 4:
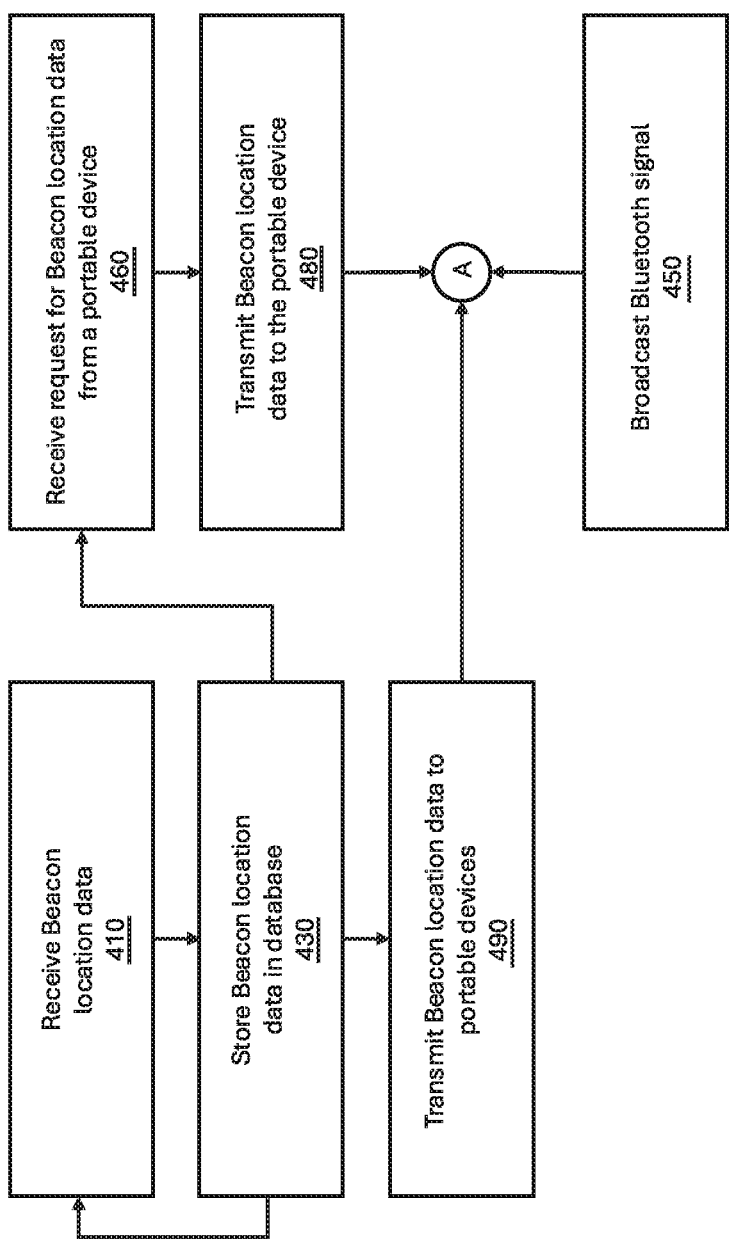
FIG. 4 is a flow chart of additional steps that may optionally precede the method of FIG. 3.
Figure 5:
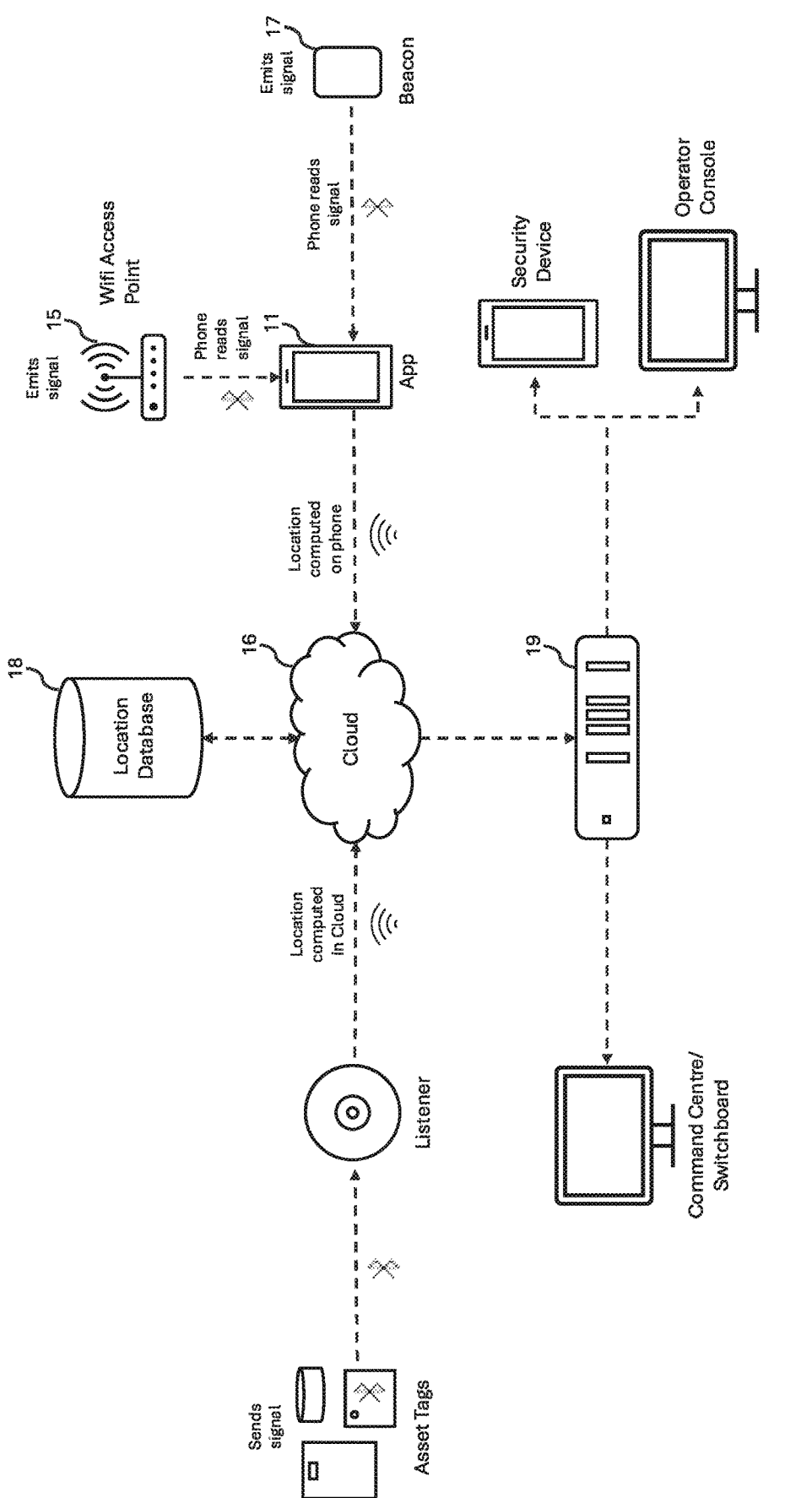

It is envisaged that each Bluetooth beacon 17 of the system 10 may be configured to broadcast a Bluetooth signal that each portable device 11 can recognize before the location of the Bluetooth beacon 17 is included in the Bluetooth beacon location data transmitted to each portable device 11. As indicated in FIG. 4, the Bluetooth beacons 17 are controlled to broadcast such a Bluetooth signal at step 450 separately from the other steps preceding the steps of FIG. 3.

Example of User Location Reporting System

FIGS. 5 to 9 illustrate an example of an embodiment of the system 10. Beginning first with FIG. 5, there is illustrated a system 10 comprising Bluetooth beacons 17, wireless data access points 15, a network 16, a database 18 storing Bluetooth beacon location data, a server 19, and portable devices 11. In addition, the system 10 also comprises multiple servers 19 in the form of a duress server, a notification server, a command centre computing device, and a messaging engine for coordinating any messaging between devices of the system 10.

Figure 6:
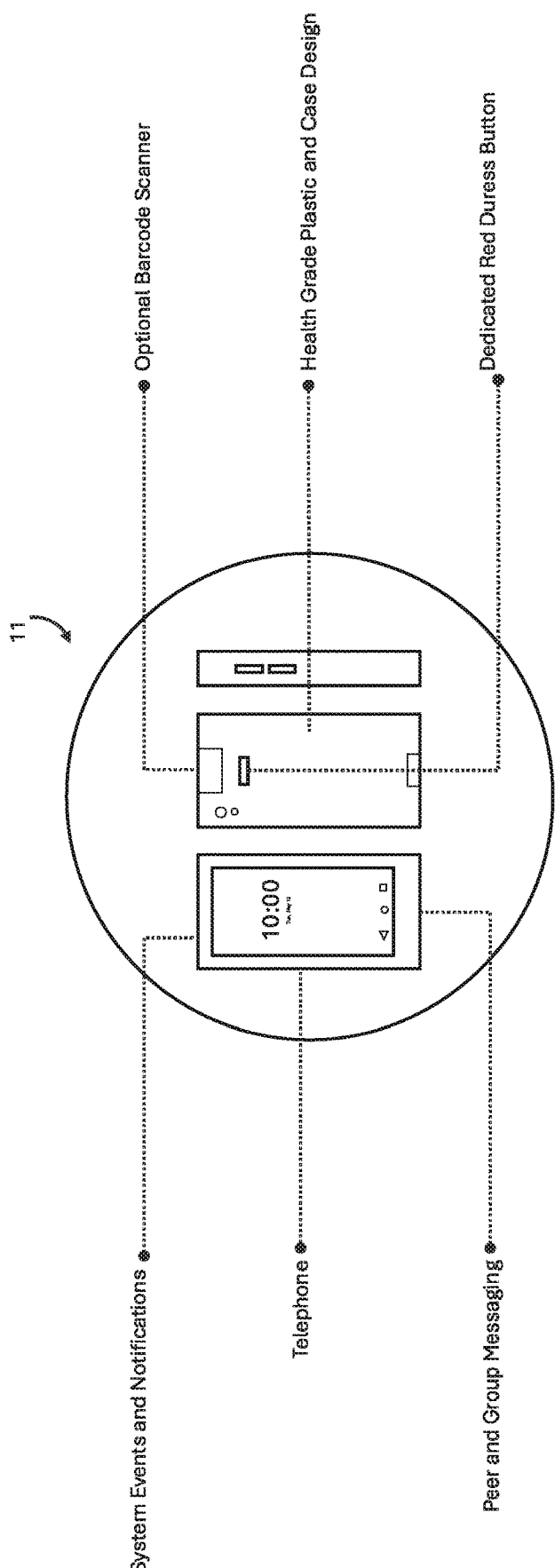
Figure 7:
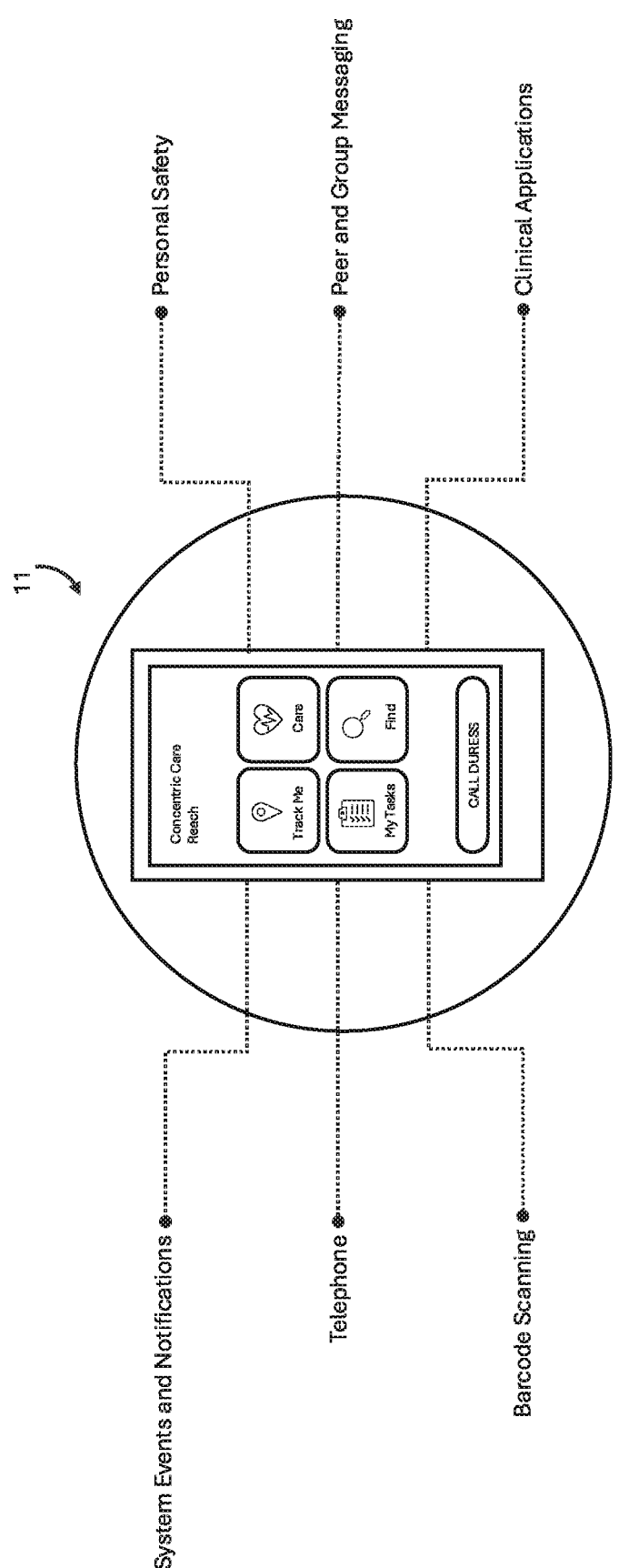
Figure 8:
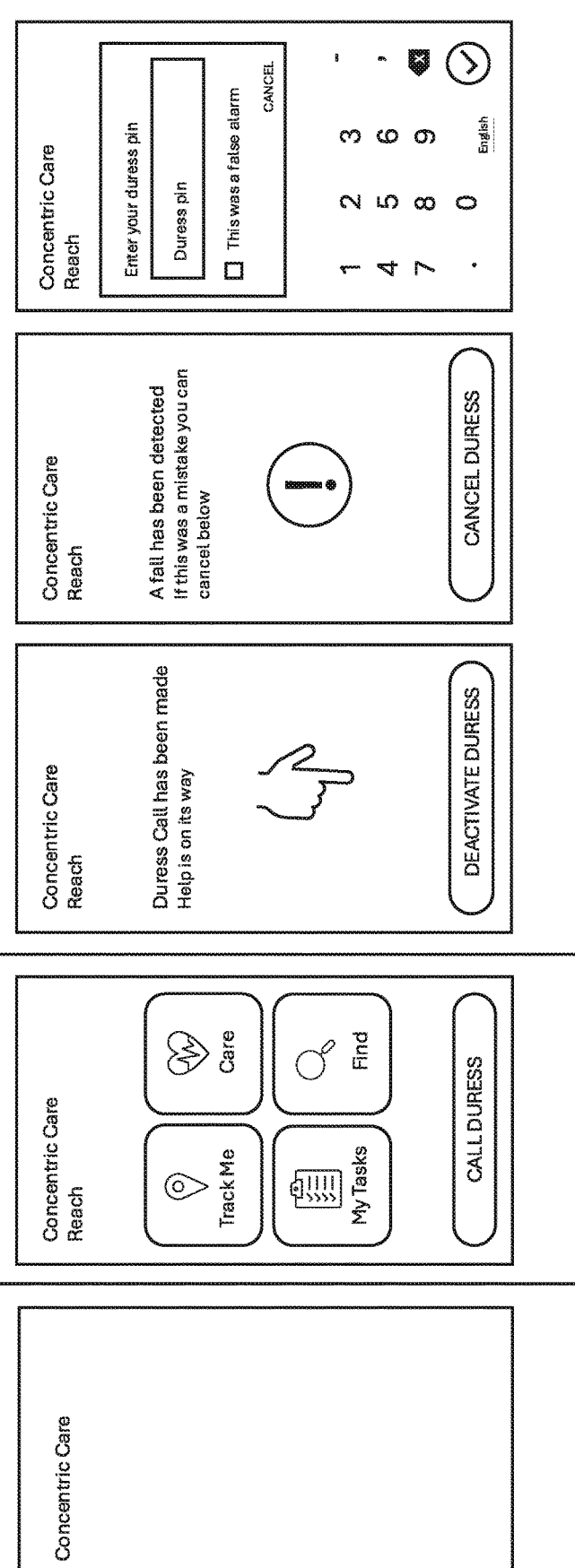

Each of the portable devices 11 is based on a mobile phone with a physical hardware button for a user to press when in duress. As illustrated in FIG. 6, the physical hardware button may be a software button in an alternative implementation. As illustrated in FIGS. 7 and 8, a bespoke application (or operating system) installed in each portable device 11 provides a user interface for a user to use. A software development kit (SDK) is provided to enable each portable device 11 to compute the location of the portable device 11 based on a Bluetooth signal detected from a Bluetooth beacon 17. The application can be used by a user to initiate a man-down algorithm. A continuous check engine is provided to enable each portable device 11 to keep track of the location of the portable device 11. In this example, the application enables each portable device 11 to report or notify other devices of the system 10, for example, via the network 16.

In this example, the location of a user within a facility can be determined by way of the following:

Bluetooth Low Energy (BLE) Beacons 17 installed around the facility.

These beacons emit known signals that the application (or App) running on each portable device 11 can read and use in calculating the location of the device 11.

When installing the beacons, a calibration process using a phone application is used to ensure the system 10 provides adequate coverage as well as sufficient accuracy. In this respect, a floor plan is uploaded onto the system 10 (for example, in the database 18) to enable a user (such as an operator) to determine that there is adequate coverage and sufficient accuracy in relation to all or required areas of the facility.

During the calibration process, the beacon locations may be calibrated to optimise location accuracy.

Zones may be marked to suit any required workflow. This is something that can be determined based on any well-known location or required boundary that needs to be monitored.

Specific Bluetooth beacons (or "exit beacons") can be strategically located such that a person walking through an exit or intending to exit with a portable device 11 can be notified. Team members of the person may also be notified in order to assist in retrieving the device.

The wireless data access points 15 are Wi-Fi wireless access points that have Bluetooth beacons capability built into them to complement the deployment of Bluetooth beacons 17, for example, in places like corridors and large rooms.

When in operation, the application running in each portable device 11 enables the portable device 11 to perform a number of functionalities:

When the application is installed in each portable device 11, the application periodically checks with the server 19 and downloads the calibrated Bluetooth beacon location data (or Map Data) and stores a copy locally on the portable device 11.

In this respect, it is envisaged that the Bluetooth beacon location data is periodically updated to ensure that any floor plans or area descriptions provided by way of the Bluetooth beacon location data are not changed.

As the portable device is moved around the facility, the portable device 11 continuously computes the location of the portable device 11 by way of the SDK.

The SDK is configured such that when a portable device 11 is not moving, computation (or calculation) of the portable device location either does not occur or is configured to occur after longer intervals to conserve battery life of the portable device 11. At such battery life conservation points, the last computed location (or "the last known location") is stored.

When a reportable incident happens (for example, some form of "duress", whether it is a soft, hard, or man-down), the location of a portable device 11 is recalculated to achieve a high level of accuracy and the recalculated location information is sent to the duress server 19 for further workflow processing. In particular, it is envisaged that the location information may be continuously sent at frequency that is higher than before (or increasing higher) until the event is stood down.

Components of each portable device 11 is also are continuously monitored, alerted, and reported to ensure proper functioning of the portable device:

For example, battery usage is checked continuously such that users are informed when a battery level reaches a pre-set minimum.

Also, network connectivity is checked by way of communication with the server 19 to ensure that Wi-Fi and or at least 4G data communication is available.

Bluetooth (BT) status on each portable device 11 is checked to ensures that the location can be computed at any time. As a fall-back mechanism, GPS functionality can be checked to ensure that GPS can be used if BT is not available or disabled.

The GPS functionality also enables each portable device 11 determine the location of the portable device 11 even if the portable device is being used outside the facility.

In addition, dark spots within the facility are checked to determine locations where a Bluetooth signal from a Bluetooth beacon 17 cannot be received or read, for example, because the Bluetooth signal is not available, or interference is limiting detection.

Each portable device 11 is also monitored when being dropped into and removed from any charging cradle such that all network/disk heavy tasks like uploading logs, analytics, man-down related data etc can be performed and configuration of the application can be updated via the server 19 to ensure that the application is customised according to up to date or latest configuration.

The application can also control volume level on the portable device 11 when acting on certain actions:

When notifications pop up, each portable device 11 can be set to use a pre-set ring tone notification and vibration.

When a manual duress is triggered, each portable device 11 can be set not make any noise and vibration is the only alert notification that is used to provide a user with assurance that the duress functionality has been successfully launched.

When man-down is detected, each portable device 11 can be set to emit a distinct low volume sound in addition to vibration. Optionally, when a portable device 11 is set in silent mode, the portable device 11 can be set to override the silent mode and play a ring tone to provide assurance that any alert is sent. If an accidental duress is triggered, the user is able to cancel it (with a PIN) by marking it as false. This cancels the event and notifies the response team that they do not need to attend the event.

Each portable device 11 can be configured such that when a person is in duress, the portable device 11 can activate a microphone of the portable device 11 so that other users of the system (such as security responders and a command centre) can hear what is going on at the duress location, for example, when a conference bridge is activated. At the same time, the portable device 11 can activate any speaker on the portable device such that a perpetrator cannot listen to any conversations taking place on the conference bridge.

Similarly, each portable device 11 can be configured such that when a person is in duress, the portable device 11 can activate a camera of the portable device such that responders can see what is happening at a duress location.

Each portable device 11 can be configured such that when a carer enters an unknown area or new environments of concern, the portable device 11 can be requested to be tracked. While in this mode, the portable device 11 may be prompted to respond to a popup on a regular basis. Failing to respond within a pre-configured time will trigger a duress response.

Each portable device 11 can be configured such that all duress calls can be deactivated using a PIN number, which may be the same or different for different users.

Each portable device 11 can be configured such that when duress is triggered in one location and then a person runs away from an assailant, a location update is provided to responders. The change of location can also be announced to participants of an audio conference.

In respect of the physical "duress" button, the button can be any external duress trigger that can automatically pair up with other BLE/NFC trigger devices such that a user can trigger a duress without having to touch a portable device 11.

For example, an external pull-cord can pair up to the phone automatically and a user can trigger duress by a simple action of pulling a thread or thread-like material.

Each portable device 11 can be configured such that a user can control a camera of the portable device 11 remotely.

Each portable device 11 can be configured such that the portable device 11 reports a battery charging state to the server 19 in order for the system 10 to monitor battery level and predict how long each portable device 11 will last for.

Each portable device 11 can be configured a self-test mode to enable a user to go through a step-by-step self-test mode in which the user will be prompted to use and test all critical features. For example, in the self-test mode, when the user raises a trigger, a message may be sent and shown to the user instead of to other users (such as a response team).

Figure 10:
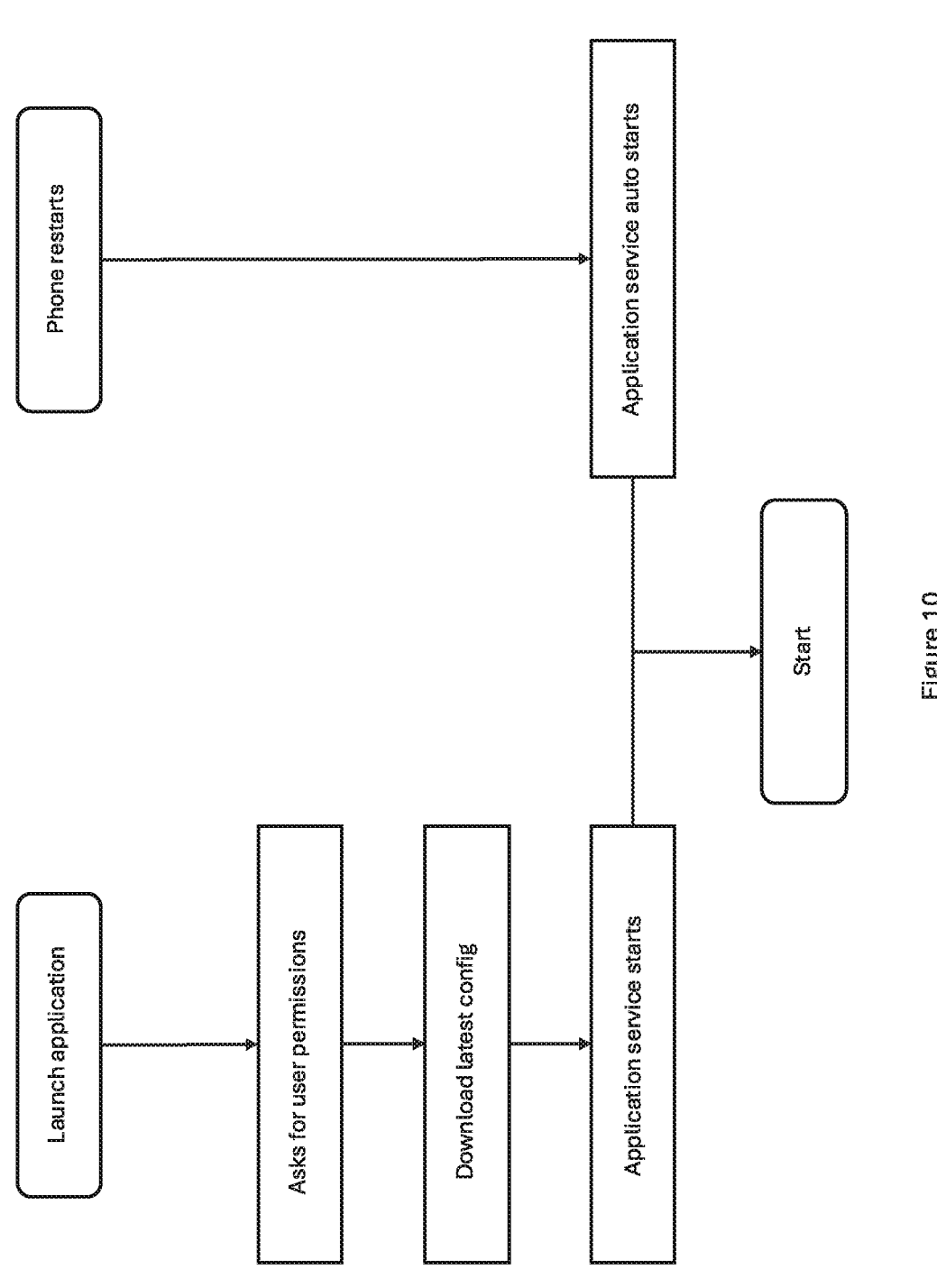
FIGS. 10 to 12 are flow diagrams of method relating to the example of FIGS. 5 to 9.
Figure 11:
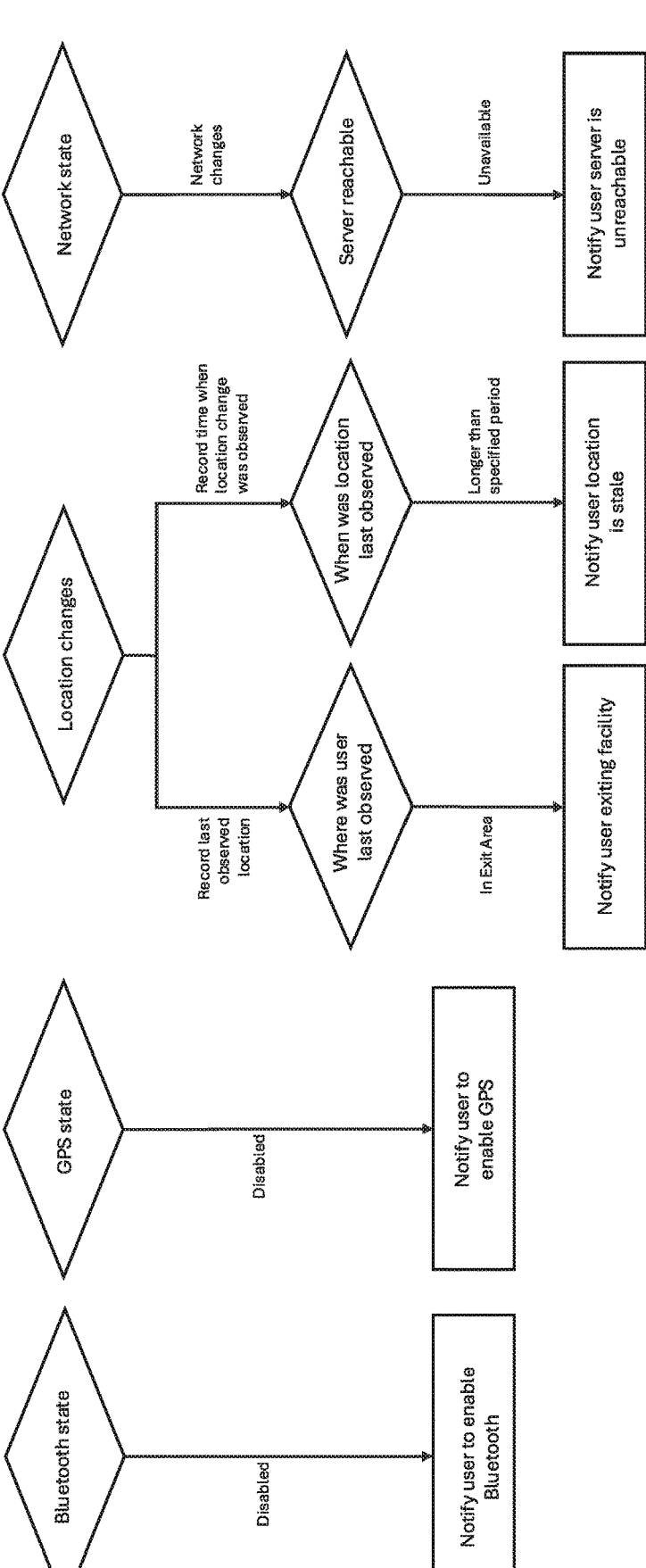
Figure 12:
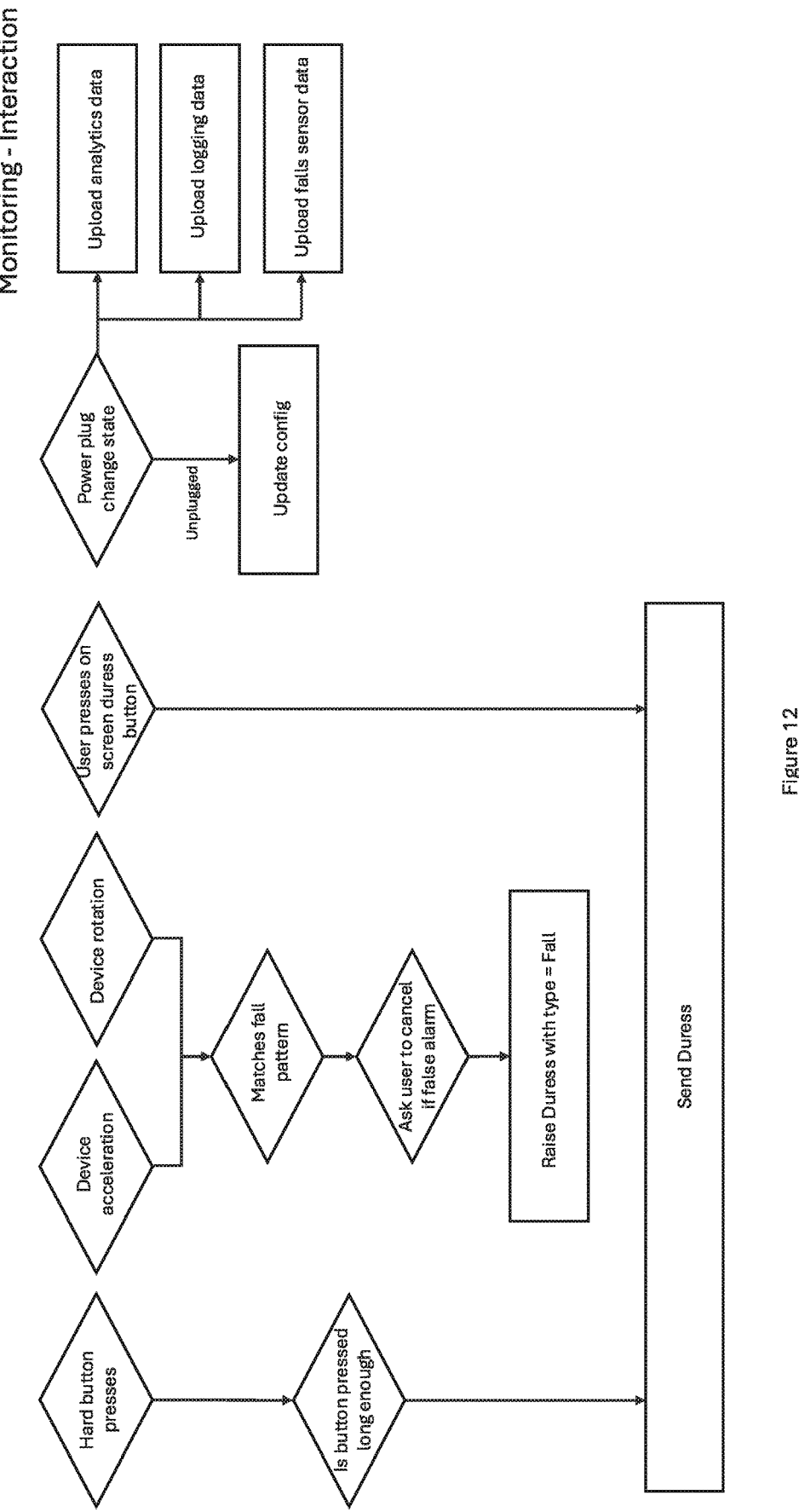

FIGS. 10 to 12 are flowcharts of methods relating to the example of the embodiment of the system 10 of FIGS. 5 to 9. FIG. 10 is a flowchart of steps relating to an initialization of an application for each portable device 11 of the system 10. FIG. 11 comprises flowcharts of steps relating to different monitoring states, specifically, enabling Bluetooth, enabling GPS, when a portable device 11 changes location, and whether a server 19 of the system 10 can be reached. FIG. 12 comprises flowcharts of steps relating to different monitoring interactions, for example, on when user locations may be sent during duress.

Further aspects of the method of FIGS. 3 and 4 will be apparent from the above description of the system. Persons skilled in the art will also appreciate that the method could be embodied in program code. The program code could be supplied in a number of ways, for example on a tangible computer readable medium, such as a disc or a memory (for example, that could replace part of the memory 110 of each portable device 11) or as a data signal (for example, by transmitting it from the server 19).

Similarly, it will be appreciated that data in memory (such as the data in the database 18) can be supplied on any appropriate tangible data carrier, such as by writing them to a portable device (such as a USB drive), storing them in a memory (including transmitting identifiers to a device having a memory) etc.

Modifications within the scope of the invention may be readily effected by those skilled in the art. It is to be understood, therefore, that this invention is not limited to the particular embodiments described by way of example hereinabove.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A system for enabling reporting of user locations, comprising:
  a plurality of Bluetooth beacons each of which is configured to broadcast a Bluetooth signal on a Bluetooth communication channel at a respective one of a plurality of Bluetooth beacon locations; and
  a portable device for use by a user,
  wherein the portable device comprises memory, and is configured to:
    receive through a wireless data communication channel Bluetooth beacon location data corresponding to the Bluetooth beacon locations;
    store the received Bluetooth beacon location data in the memory;
    monitor the Bluetooth communication channel in order to detect for any broadcasted Bluetooth signal;
    upon detecting a plurality of broadcasted Bluetooth signals, determine whether or not there is a change in a location of the portable device by:
      determining a strongest one of the plurality of broadcasted Bluetooth signals; and
      comparing the strongest detected Bluetooth signal against the Bluetooth beacon location data stored in the memory; and
    in response to determining that there is a change in the location of the portable device, transmit via the wireless data communication channel to an external computing device portable device location data corresponding to the location of the portable device in order to thereby report a location of the user.

2. A system as claimed in claim 1, wherein the portable device is configured to monitor the Bluetooth communication channel while communicating data on the data communication channel.

3. A system as claimed in claim 1, further comprising a plurality of wireless data access points for enabling the portable device to communicate data via the wireless data communication channel at respective wireless data transceiver locations.

4. A system as claimed in claim 1, wherein each Bluetooth beacon is in data communication with at least one of the wireless data access points in order to enable calibration of the Bluetooth beacon location data.

5. A system as claimed in claim 1, further comprising the external computing device.

6. A system as claimed in claim 5, wherein the external computing device is configured to receive Bluetooth beacon location data corresponding to the Bluetooth beacon locations, and to store the received Bluetooth beacon location data in a database.

7. A system as claimed in claim 6, wherein the portable device receives the Bluetooth beacon location data by receiving from the external computing device the Bluetooth beacon location data stored in the database.

8. A system as claimed in claim 1, wherein the portable device is configured to make a request for the Bluetooth beacon location data.

9. A system as claimed in claim 8, wherein the portable device makes a request for the Bluetooth beacon location data periodically.

10. A system as claimed in claim 1, wherein the external computing device is configured to transmit updated data in respect of the Bluetooth beacon location data, in response to determining that there is an update of the Bluetooth beacon location data stored in the database.

11. A system as claimed in claim 1, wherein the updated data is updated version of Bluetooth beacon located data.

12. A method of enabling reporting of user locations by a system comprising a portable device and a plurality of Bluetooth beacons located at respective locations, comprising:

transmitting through a data communication channel to the portable device Bluetooth beacon location data corresponding to the respective locations of the plurality of Bluetooth beacons;

storing the Bluetooth beacon location data in a memory of the portable device;

controlling each one of the plurality of Bluetooth beacons to broadcast a Bluetooth signal on a Bluetooth communication channel;

controlling the portable device to monitor the Bluetooth communication channel in order to detect for any broadcasted Bluetooth signal;

upon detecting a plurality of broadcasted Bluetooth signals, determining by the portable device whether or not there is a change in a location of the portable device by:

determining a strongest one of the plurality of broadcasted Bluetooth signals;

comparing the strongest detected Bluetooth signal against the stored Bluetooth beacon location data; and in response to determining that there is a change in the location of the portable device, transmitting from the portable device via the data communication channel to an external computing device portable device location data corresponding to the location of the portable device in order to thereby report a location of the user.

13. A portable device for reporting user locations, comprising:

a Bluetooth signal detector;

a wireless data communication transceiver;

a memory storing program code; and a processor configured to execute the program code in order to implement at least:

a Bluetooth beacon location data receiver configured to control the wireless data communication transceiver to receive through a wireless data communication channel Bluetooth beacon location data corresponding to respective locations of a plurality of Bluetooth beacons, and to store the Bluetooth beacon location data in the memory;

a Bluetooth beacon detector configured to control the Bluetooth signal detector to monitor a Bluetooth communication channel in order to detect for any broadcasted Bluetooth signal;

a portable device location determiner configured to, upon detecting a plurality of broadcasted Bluetooth signals, determine whether or not there is a change in a location of the portable device by:

determining a strongest one of the plurality of broadcasted Bluetooth signals; and comparing the strongest detected Bluetooth signal against the stored Bluetooth beacon location data; and a portable device location reporter configured to, in response to determining that there is a change in the location of the portable device, control the wireless data communication transceiver to transmit via the data communication channel to an external computing device portable device location data corresponding to the location of the portable device in order to thereby report a location of the user.

14. A method of reporting user locations by a portable device of a user, comprising:

receiving through a data communication channel Bluetooth beacon location data corresponding to respective locations of a plurality of Bluetooth beacons;

storing the Bluetooth beacon location data in a memory of the portable device;

monitoring a Bluetooth communication channel in order to detect for any broadcasted Bluetooth signal;

upon detecting a plurality of broadcasted Bluetooth signals, determining whether or not there is a change in a location of the portable device by:

determining a strongest one of the plurality of broadcasted Bluetooth signals; and comparing the strongest detected Bluetooth signal against the stored Bluetooth beacon location data; and in response to determining that there is a change in the location of the portable device, transmitting via the data communication channel to an external computing device portable device location data corresponding to the location of the portable device in order to thereby report a location of the user.

* * * * *